July 9, 1929. W. B. EDDISON 1,720,211
METHOD OF AND APPARATUS FOR SEPARATING LIQUIDS AND SOLIDS
Filed March 14, 1925 3 Sheets-Sheet 1

INVENTOR
William Burton Eddison
BY
his ATTORNEY

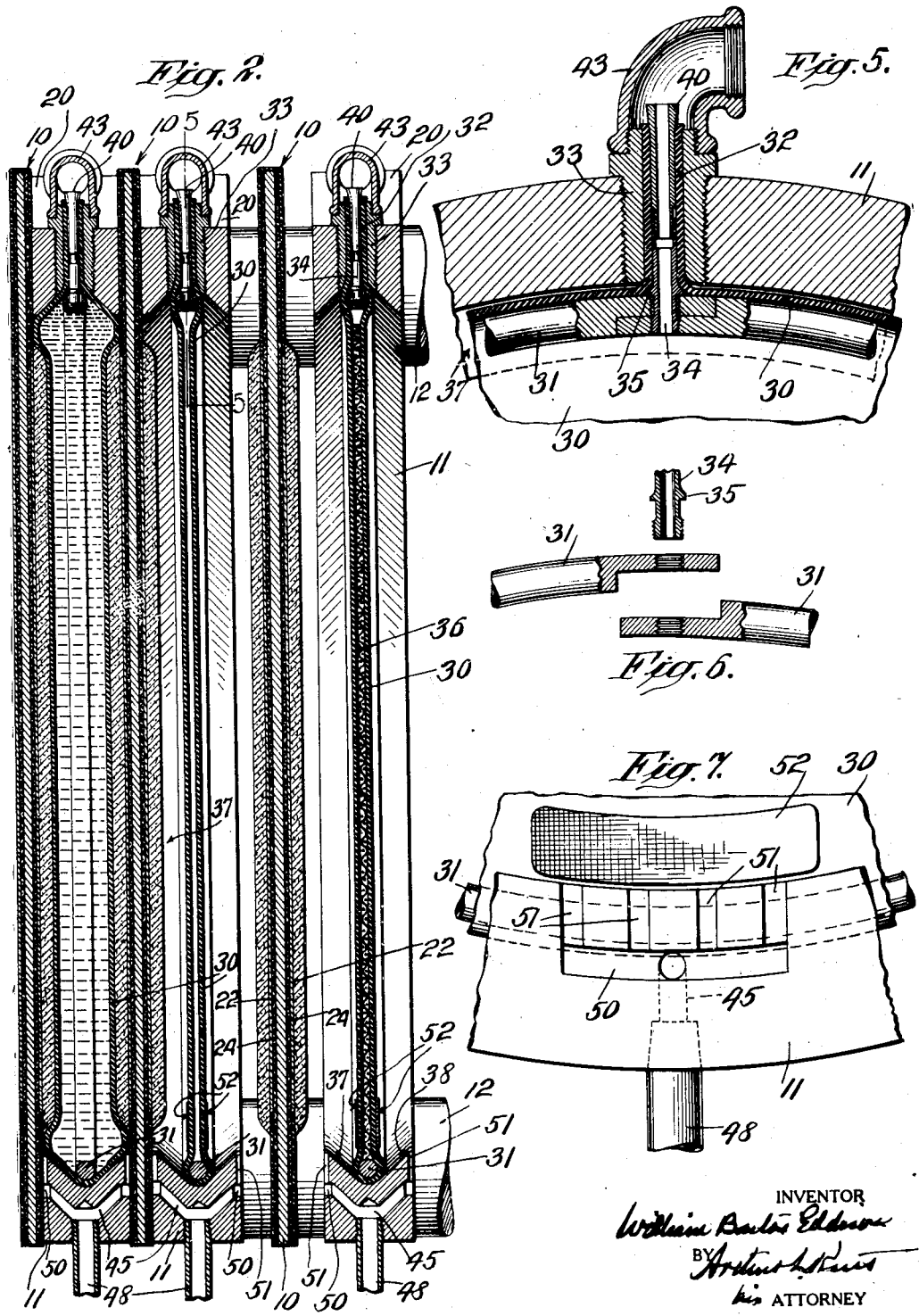

July 9, 1929.   W. B. EDDISON   1,720,211
METHOD OF AND APPARATUS FOR SEPARATING LIQUIDS AND SOLIDS
Filed March 14, 1925   3 Sheets-Sheet 3
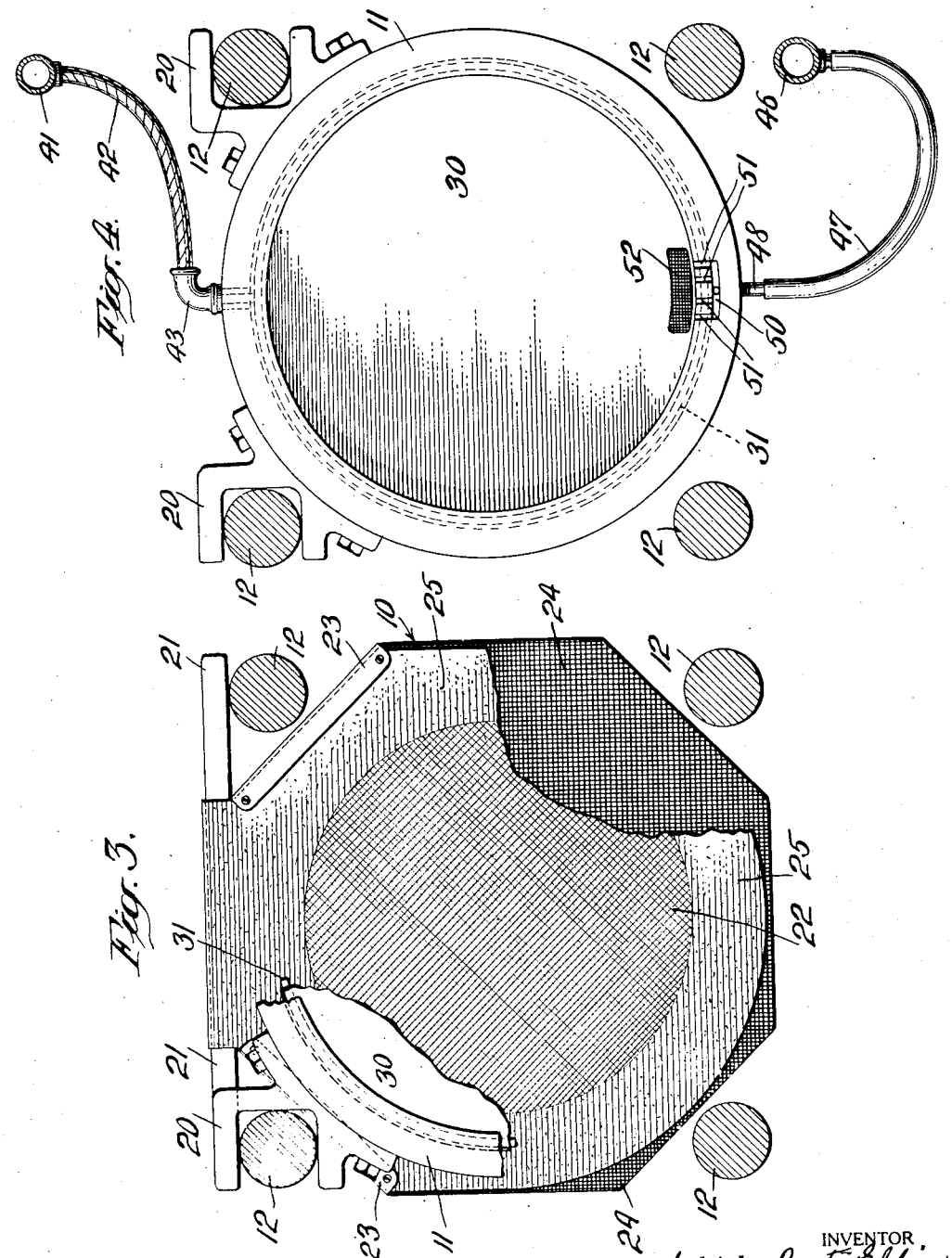
INVENTOR
William Barton Eddison
BY
his ATTORNEY Patented July 9, 1929.

1,720,211

UNITED STATES PATENT OFFICE.

WILLIAM BARTON EDDISON, OF IRVINGTON, NEW YORK.

METHOD OF AND APPARATUS FOR SEPARATING LIQUIDS AND SOLIDS.

Application filed March 14, 1925. Serial No. 15,443.

This invention relates to a method of and apparatus for separating liquids and solids. In separating the liquid and solid constituents of a mixture of liquid and suspended solid matter by means of a filter press, a considerable portion of the liquid remains as excess water in the filter cake. This makes it necessary, when the object is to recover the liquid or a substance in solution in the liquid, to wash the filter cake, usually by passing water or other suitable liquid through the filter press while the cake remains on the filtering surface. This results in dilution of the separated liquid and increases the cost of concentrating the liquid and of recovering substances in solution in the liquid. When the object is to recover the solid matter, it is in most cases necessary to subject the filter cake to a drying operation for the purpose of removing a further amount of the liquid. The present invention aims to get at a minimum cost and in a minimum amount of time, the maximum possible separation of the constituents of a mixture of liquid and solid matter, whether the purpose be to recover the liquid or to recover the solid matter; to recover the liquid with a minimum of dilution, and to produce a filter cake of desired predetermined liquid content and uniformly moist throughout.

The invention comprises a method wherein the greater portion of the liquid is separated from the solid matter of the mixture by filtering, and the filter cake is then subjected to squeezing pressure whereby a further amount of liquid is expressed therefrom. The invention also comprises an apparatus for carrying out the method.

As stated, in separating the liquid and solid constituents of a mixture of liquid and suspended solid matter in a filter press, a considerable amount of liquid remains in the filter cake, and this is so, even when the liquid mixture is forced against the filtering surface under a very considerable pressure. The total liquid content of the filter cake will be in the neighborhood of 25% by weight when the solid matter is a clay mixture such as is commonly used for making electrical insulators and the liquid mixture, or slip, has been forced against the filtering surface under about a hundred pounds pressure, about one-half of this 25% being pore water and one-half being excess water. The liquid content may be more or less than this according to the character of the solid material and the filtering pressure employed. I have found that a further separation of liquid from the filter cake may be secured advantageously by subjecting the cake to pressure, most desirably between the filtering surface and a pressing member. In this way substantially all of the excess liquid may be very quickly squeezed out of the cake. When the object is to recover the liquid, the application of a sufficient squeezing pressure for a sufficient but relatively short time will result in the separation from the solid matter of all its contained liquid excepting the pore liquid and a very small percentage, which may be as low as a fraction of 1%, of excess liquid. And pressure so applied to the moist filter cake apparently causes some re-arrangement of the particles of solid matter by which re-arrangement the pores or spaces between the particles are somewhat reduced so that the pore liquid retained by the cake of solid matter is less than the amount of pore liquid which the cake would otherwise have. After subjecting a filter cake of common insulator clay one inch thick to a squeezing pressure of 450 lbs. per square inch for a period of fifteen minutes, I have found the clay to contain less than .7% of excess water, the amount of pore water being about 14.2%.

When the object is to recover the solid matter, the application of the squeezing pressure to the filter cake makes it possible not only to reduce the liquid content of the cake to a fraction of 1% of liquid in excess of the pore liquid, but, also, the liquid content may be quickly and accurately reduced to any desired predetermined amount between that of the filter cake as left after the filtering step and the pore liquid content of the material. The amount to which the liquid content of any given material is reduced will depend upon the degree of pressure applied, for sufficient time, to the filter cake; that is, the degree of pressure maintained for a sufficient length of time will determine the liquid content of the squeezed material or cake, and the length of time for which the pressure must be maintained will depend on the character of the material and on the thickness of the cake. I have found for a cake of one inch thickness the time required to express substantially all the possible liquid at a given pressure to vary from four minutes to two hours according to the character of the material. An open clay such as is used in making saggers has taken the minimum length of time, and a fine retort clay such as is used in the manufacture of zinc retorts has taken the maximum length of time. Maintaining the pressure on the cake beyond the required minimum period does not result in any further reduction of the liquid content; and the degree of moisture of the cake at the time the pressure is applied, while it affects slightly the time for which the pressure must be maintained, has no other effect upon the final moisture content of the pressed cake. Increase or decrease in the degree of pressure applied will result in a corresponding decrease or increase of the liquid content of the treated material. When the degree of pressure has once been determined for reducing the liquid content of any given material to a desired predetermined liquid content amount, this predetermined liquid content of such material may thereafter be produced by applying such determined pressure for a sufficient time; and the required time for maintaining such pressure in a given sized mass or cake of such material may also readily be determined.

The apparatus forming part of the present invention and which is most desirably used for practicing the method comprises a filter press having pressing means whereby the filter cakes are pressed between the filtering surface and such pressing means. The press is most desirably of the plate type, constructed with a series of partition and drainage plates which alternate with and are separated by spacing frames carrying each a flexible inflatable member which during the time that the filter cakes are being built up on the filtering surfaces carried by the drainage plates are deflated and stand off away from the filtering surfaces, and which after the filter cakes are formed are inflated and their walls forced by fluid pressure against the filter cakes to compress the cakes against the drainage plates. The invention on its apparatus side includes various features of construction and arrangement of parts as hereinafter set forth.

The invention is capable of wide application in the separation of various liquids and solids and for conditioning various solid materials. It is considered of special value in providing an improved method and apparatus for conditioning clay and other plastic earthy materials for the molding of ceramic products by what is known as the dry-press process, in which the material is pressed into the desired shape in a die. In producing molded articles in this way, the pulverized, i. e., finely divided, material, should have the right moisture content and should be uniformly moist throughout. The present method of conditioning clay for dry-press molding, in which the filter cakes obtained by filter-pressing the mixture of clay and a large excess of water are removed from the filter press to a steam-heated dryer where they remain for a period of from several hours to overnight and are then put through a tempering process to secure the desired right and uniform moisture content, involves very considerable time and labor expense and is otherwise unsatisfactory, being inexact and leading to much difficulty in having clay of the right moisture content ready for pressing, especially after week-ends and holidays. The present invention reduces greatly the time required for conditioning clay for dry press work and makes it possible to produce more surely and reliably and at much less cost a better conditioned clay having the desired moisture content and uniformly moist.

A full understanding of the invention can best be given by a detailed description of a complete apparatus embodying the apparatus features of the invention and adapted for use in carrying out the method, and of the use thereof. Such a description will now be given in connection with the accompanying drawings illustrating such an apparatus of approved form, and in which:—

Fig. 2 is a central vertical sectional view of a portion of the press and dryer on an enlarged scale and showing parts separated for the removal of the filter cakes from one of the drainage plates;

Fig. 3 is a transverse sectional view showing one of the drainage plates with filter cloth thereon partly broken away, and showing also a part of one of the spacing rings with a portion of the pressure bag carried thereby;

Fig. 4 is a transverse sectional view showing one of the spacing rings in elevation with the pressure bag carried thereby, Figs. 3 and 4 being on a scale between those of Figs. 1 and 2;

Fig. 5 is an enlarged detail sectional view taken on line 5—5 of Fig. 2;

Fig. 6 is a detail view of parts shown in Fig. 5 but separated from each other; and Fig. 7 is an enlarged view of a portion of the face of one of the spacing rings and a part of the pressure bag carried thereby.

Figure 1:
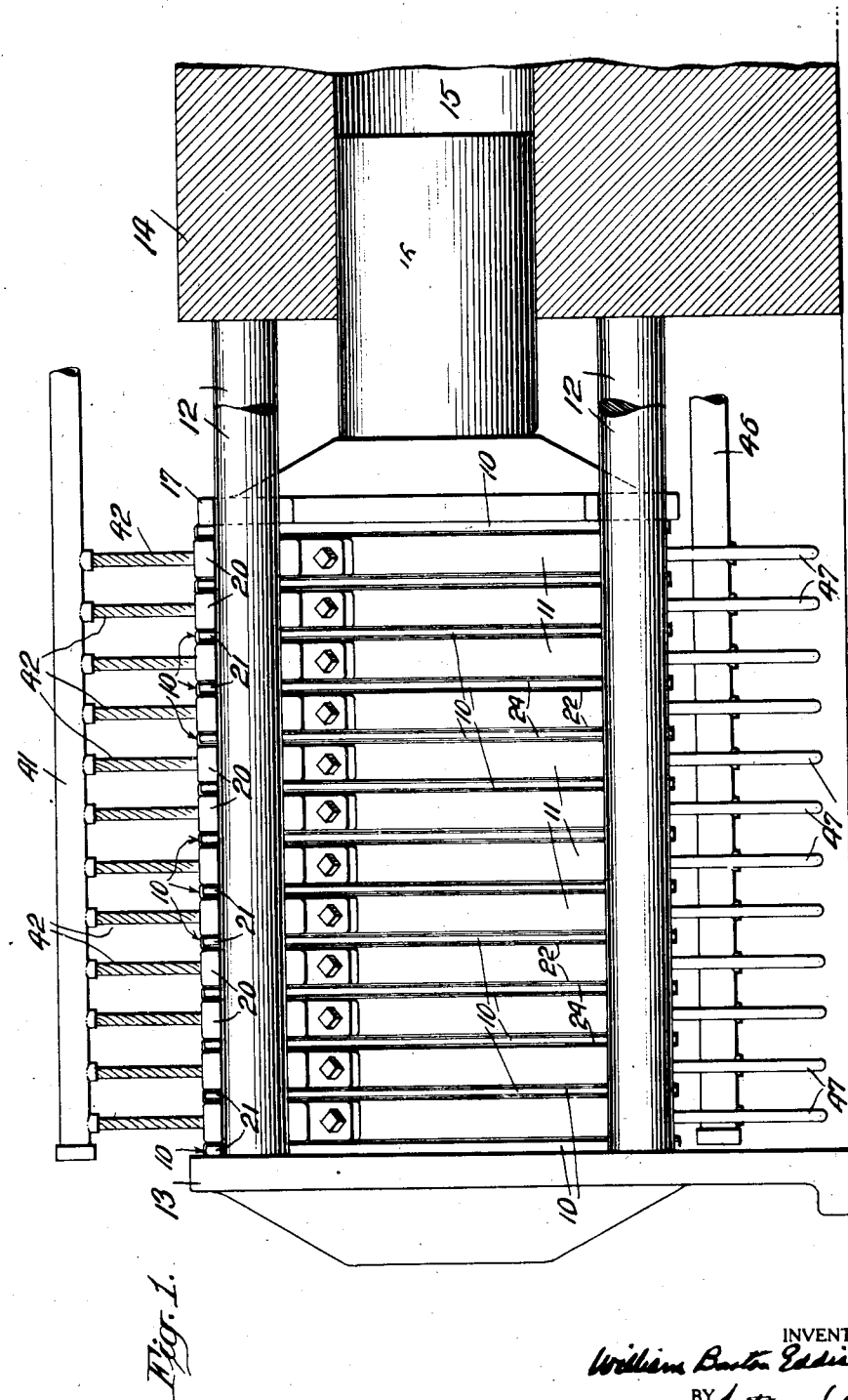
Fig. 1 is a side view of a combined filter press and pressure dryer in accordance with the invention.

Referring to the drawings, the apparatus shown comprises a series of alternating drainage plates 10 and spacing frames or rings 11 which are hung on the upper two of four tension members or bars 12 which extend between press ends 13 and 14. The press end 14 is formed with a hydraulic cylinder 15, partly shown, in which moves a piston 16 which carries at its inner end a pressure plate 17. The piston 16 and its pressure plate 17 act to press and hold the drainage plates and spacing frames together when the hydraulic pressure is on the piston. Withdrawal of the piston 16 permits the drainage plates and spacing frames to be separated for removal of filter cakes formed on the filtering surfaces of the drainage plates. The press may be made with any desired number of filter pressing units, each consisting of a spacing frame and the adjoining drainage plates, and the plates and frames may be of any suitable size, according to the desired capacity of the press.

The spacing frames or rings 11 are most desirably of annular form and are hung on the upper tension members 12 by means of brackets 20, so that the rings may be moved longitudinally of the tension members when not held pressed between adjoining drainage plates. The drainage plates 10 are solid plates of metal or other suitable material of a size to correspond to the spacing rings, and desirably, having surfaces sufficiently large to extend somewhat beyond the outer circumference of the rings. They are conveniently made of octagonal shape as shown to fit within the four tension members and are hung on the two upper tension members by projections, or brackets, 21. The two faces of each plate are covered by a filter cloth 22, except that the end plates need have the filter cloth only on their inner faces. The filter cloths for covering the two faces of a plate are conveniently formed in a single piece hung over the top of the plate as shown, and means such as the holding strips 23 are desirably provided for holding the shaped filter cloths in place when the plate is separated from the adjoining spacing rings. The faces of the plates are formed to permit draining off of liquid which passes through the filter cloth, and for this purpose the plates are provided with coverings of wire gauze, or fine wire netting, 24. This wire gauze is of sufficient strength and of sufficiently fine mesh to support the filter cloth and at the same time provide the necessary flow-ways for the draining off of the liquid. The filter cloth may be any suitable cloth impervious to the solid matter of the mixture or other sheet material suitable to permit the passage of the filtrate while holding back the solid matter. For a purpose hereinafter explained, an outer portion 25 of each filter cloth is made impervious to the passage of the filtrate, as by being provided with a coating of rubber composition or other suitable impervious coating, and this impervious portion or coating extends inward a short distance beyond the line of contact with the filter cloth of the inner edge of the spacing ring, leaving a central uncoated pervious filtering portion of the filter cloth of a diameter somewhat less than the inner diameter of the spacing rings.

Each of the spacing rings 11 carries a flexible inflatable pressure member 30 which is formed by a bag having walls of flexible rubber or other suitable elastic flexible and expansible material. The bags are made to have flat parallel sides when deflated and are round and of a size to fit within the rings 11, and each bag is held in position in its ring 11 by a holding ring 31 which is a split ring formed by an annularly bent rod of metal or other suitable material having ends adapted to be secured together when the rod is in holding position and to be disconnected to permit the ends of the rod to overlap and the holding ring to be thereby contracted for the placing or removal of the bag. The inner face of each spacing ring is formed with a circumferential groove in which the edge portion of the bag seats when forced outward by its holding ring 31. The bags are formed with radially extending filling tubes or necks 32 of the same material as the bag, and each spacing ring has a radial opening in which is screwed a bushing 33 through which the neck of the bag extends and which has a threaded outer end for connecting a branch from a pressure fluid manifold. The ends of the rods 31 are cut away, as shown in Figs. 5 and 6, to form flat-faced overlapping portions having registering threaded holes to receive the threaded end of a short tube or nipple 34 which serves to secure the ends of the rod 31 together and the outer end of which extends into the filling tube or neck 32 of the bag.

When a bag is to be positioned in its spacing ring, it is placed in position with the ends of its holding ring 31 disconnected and the ring contracted. The ends of the ring rod are then manipulated through the flexible walls of the bag and forced apart to expand the ring and to bring the rod ends to their normal overlapping position with their threaded holes registering with each other. The nipple 34, positioned in the hole of the outer overlapping rod end, is then screwed in to extend into the threaded hole of the inner overlapping rod end and to fasten the overlapping ends securely together. In order that the overlapping ends may be tightly clamped together by the screwed-in nipple, the nipple is formed beyond its threaded end with a shoulder 35 and the thread is cut away for a distance from the shoulder equal to or slightly greater than the thickness of the outer overlapping rod end, so that when the shoulder 35 comes into engagement with the outer rod end, the nipple thread will be acting only on the inner overlapping rod end and further turning of the nipple will, therefore, cause the rod ends to be tightly clamped together.

The bags are desirably of such size that normally, i. e., when deflated, they will be held under slight tension by the holding rings 31, this slight tension serving to hold the sides of the deflated bags flat and preventing the deflated bag from buckling and interfering with the formation of the filter cakes. Instead of depending on the tension of the bag walls to hold the walls flat when the bag is deflated, a positioning sheet or thin plate 36 may be provided in each bag against which the walls may be collapsed. This plate may be of corrugated metal or of wire netting or of other suitable material and form. Such a plate is shown in one of the bags shown in Fig. 2. Such positioning plates will hold the walls of the collapsed bags flat even though the walls are not under tension, but most desirably the bags will be under slight tension when deflated even when the positioning plates are provided. The inner face of each spacing ring is desirably sloped inward from the bag-seating groove as shown at 37 and 38 to provide slanting seats for the outer or edge portions of the bag sides in order to avoid the straining of such edge portions of the bag which might otherwise result when the bag is inflated.

The filling tube or neck 32 of each bag is secured in the bushing 33 by means of a short tube 40 which is inserted in the outer portion of the tube 32 and has its outer end tapered or outwardly flared to force the rubber tube against the wall of the bushing. A tight joint is thus provided between the filling tube or neck of the bag and the bushing since the high pressure used in expanding the bag tends to make the joint tighter, and friction holds the tube 40 in place under the negative pressure used in exhausting the bag. The tube 40 extends inward to the nipple 34 in order to provide a free passage and prevent collapse of the rubber tube under any suction applied to deflating the bag. The meeting ends of the tube 40 and of the nipple 34 are desirably cut away, one externally and the other internally, to provide a telescoping joint and give substantially continuous support for the rubber tube. Each bag is connected to a pressure fluid manifold 41 by means of a flexible tube 42 which is connected to the end of the bushing 33 by a connection 43.

Each spacing ring has an inlet opening 45 for supplying the mixture of liquid and solid matter to be filtered to the filter chamber, or space within the ring between adjacent drainage plates when the press members are assembled and clamped in filtering position. The mixture to be filtered, usually termed "slip" when the mixture is one of clay and water, is supplied to the inlet openings 45 of the spacing rings from a supply manifold 46 through flexible tubes 47 which connect to tubular connections 48 screwed into the openings 45. The flexible connections between the manifolds 41 and 46 and the spacing rings permit the spacing rings to be moved back and forth for unloading and resetting the press. Suitable rubber hose may be used for the connections 47 from the supply manifold 46, but the connections 42 from the pressure manifold 41 are, because of the higher pressures employed, desirably made of suitable flexible metallic hose. The slip inlet openings 45 are branched to supply the slip at each side of the bag, and the branches extend outward to the side faces of the ring, each branch opening into a short circumferentially extending groove 50 from which several shallow grooves 51 lead inward to the inner edge of the face of the ring. The supply passages thus provided opening into the filter chambers, while small as they desirably should be, are readily accessible for cleaning. As the side faces of the ring rest against the impervious portions 25 of the filter cloths on the drainage plates when the plates and rings are assembled together, the grooves 50 and 51 provide closed passages leading from the inlet openings 45 to the filter chambers. In order to prevent the walls of the bags from being forced into the openings at the inner ends of the grooves 51 when the bag pressure is on, the bags are provided with patches 52 of relatively strong and nonstretchable but flexible material over the portions which come opposite the ends of the grooves 51 when the bag is inflated.

In the use of the apparatus, the drainage plates and spacing rings being moved into closed position and held pressed together by the hydraulic piston 16, and the drainage plates having been fitted with filter cloths as shown, and the pressure bags being collapsed so that their sides are withdrawn away from the filtering surfaces, the slip or other mixture of liquid and suspended solid matter to be filtered is turned on to flow from the supply manifold 46 through the flexible pipes 47 and inlet openings 45 into the filter chambers. The slip fills the filter chambers and, being supplied under suitable pressure, is forced against the filtering surfaces provided by the filter cloths on the drainage plates, and filtering takes place in the usual manner, the filtrate draining off over the surfaces of the drainage plates, and the filter cakes building up on the filtering surfaces. The filtering operation will be continued until the filter cakes have been built up to the desired thickness, the time required for forming a cake of a given thickness depending upon the character of the solid material in the mixture and upon the pressure under which the mixture is forced into the press. The resulting filter cakes will contain a considerable amount of liquid in excess of the pore liquid, the exact liquid content depending on the character of the material and the filtering pressure.

When the filter cakes have been built up to the desired thickness, the feeding of the mixture to the press is stopped, and the pressure fluid is then admitted to the pressure bags until the bags are expanded to fill the filter chambers and press against the filter cakes, the liquid mixture in the filter chambers being forced back through the inlet openings 45 and some being forced into and through the filter cakes. The pressure is then increased to the desired maximum and maintained for the required length of time. Because of the high pressures used, hydraulic pressure is most desirably employed. The filter cakes are thus squeezed between the filtering surfaces and the bag walls and the excess water is forced out from the cakes through the filter cloths until the liquid content of the cakes has been reduced to an amount dependent upon the degree of pressure applied to the cakes. After the pressure has been maintained for the necessary time it is cut off and a negative pressure is applied to the manifold 41 to draw the water from the bags and collapse the bags, the sides of the bags drawing away from the pressed filter cakes and returning to their normal position. Fig. 2 shows at the extreme left a pressure bag expanded to pressing position by the fluid admitted through its neck and fastening nipple 34. The bag in the next frame to the right in this figure is shown as it appears when collapsed back to its normal position.

For removing the pressed filter cakes from the filter press, the hydraulic piston 16 is withdrawn and the drainage plates and spacing rings are successively moved to the right to space successive drainage plates away from the adjacent spacing rings sufficiently for removal of the filter cakes therefrom. When the rings are thus separated from a plate, as shown at the right in Fig. 2, the filter cakes will hang on the filter cloths from which they may be readily separated to drop down from the press.

Because of the impervious outer portion 25 of the filter cloths which extend a short distance inward from the inner edge of each spacing ring and prevent the passage of the filtrate through these outer portions of the filter cloths, the filter cakes are prevented from extending out edgewise into contact with the spacing rings. The filter cakes will build up only from points on the filter cloth through which the filtrate can pass, and will therefore build outward from the inner edge of the impervious coating only for a distance substantially equal to the thickness of the cake, as shown in Fig. 2. Therefore, by having the impervious coatings extend inward from the inner face of the spacing rings a distance somewhat greater than the thickness of the cakes to be formed, contact of the cakes with the spacing rings is effectually prevented and the cakes, engaging only the flat surface of the cloths, are readily separated therefrom. Without this provision of the impervious outer portions of the cloths, the cakes would build up against the spacing rings and cause difficulty in separating the rings and the drainage plates, even though the inner faces of the rings were slanted outward instead of inward as shown. This difficulty would be even greater with the spacing rings formed as shown, and the ability to have the rings formed with inwardly slanting inner faces is an added advantage of providing the filtering surfaces with impervious outer portions extending inward beyond the inner edges of the rings. When the pressure bags are collapsed after being maintained under high pressure for a sufficient time they readily pull away from the surface of filter cakes and are left clean and almost dry.

When the object is to recover the liquid from the mixture of liquid and solid matter supplied to the filter press, a very high pressure, which may be as much as 400 pounds or more to the square inch, is applied to the bags, and this pressure in a short time, usually not more than 10 to 20 minutes, will express substantially all the excess liquid from the filter cakes, leaving only, for most solid materials, a fraction of 1% of liquid in excess of pore liquid, and reducing the pore space of the filter cake, and therefore, the amount of liquid which can be retained by it as pore liquid, as hereinbefore explained. When the liquid is being separated for the purpose of concentration and recovery therefrom of a substance in solution therein, or when for other reason it is desired to remove as completely as possible any soluble substance from the solid matter, the filter cakes may be washed while still remaining in position in the press by admitting to the filter chambers, after the cakes have been pressed and the bags contracted, water or other suitable liquid under suitable pressure to be forced into or through the cakes, and then admitting pressure fluid again into the bags to force back the liquid from the filter chambers and express again excess liquid from the filter cakes; and this process may be repeated as desired. In this way substantially all of the substance in solution may be removed from the filter cakes with the use of an amount of water or other liquid which is relatively very small as compared to the amount required in washing the filter cakes in the ordinary manner.

When the object is to recover the solid matter, the degree of pressure to be applied to the filter cakes by means of the inflated bags will depend upon and be determined by the degree to which it is desired to reduce the liquid content of the cakes. If it is desired to express from the cakes substantially all the liquid in excess of the pore liquid, the maximum possible pressure will be applied to the bags, and this pressure will be maintained so long as any liquid flows from the press. By applying a lesser degree of pressure and maintaining it until after the flow of liquid from the press ceases, the liquid content of the filter cakes may be reduced to any desired amount between that of the filter cake before pressing and a content slightly above the pore liquid content. The final liquid content will vary according to the pressure applied, and a given pressure applied for a sufficient length of time will always result in the same liquid content of a given material. When the pressure needed to secure a desired liquid content in certain material has once been determined, the application of such predetermined pressure to the same material can be depended upon to give the same liquid content in the product, and this is so irrespective of the thickness of the filter cake or mass of material being pressed or of its liquid content at the beginning of the pressing operation, provided the pressure is maintained until after the liquid ceases to flow from the press. Maintaining the pressure beyond such minimum pressure period does not change the liquid content. Of course, in operating with any given bag pressure, the pressure might be cut-off before all the liquid has been pressed out of the filter cakes which would be pressed out under such pressure if longer maintained, that is, before the liquid has ceased to flow from the press. But, if the pressure is so cut off before the liquid has ceased to flow from the press, then the filter cakes will be left unevenly moist. By maintaining any given pressure on the cakes until after the liquid has ceased to flow from the press, a uniform liquid content throughout each cake is secured.

The time for which any given pressure should be maintained to secure its maximum result and a uniform liquid content will, as stated, vary according to the character of the material being pressed, the thickness of the material, and to a slight degree on the liquid content at the start of the pressing operation. For cakes of the same material and of the same thickness, and of substantially the same liquid content at the start, the required minimum pressure period for securing the maximum result of any given pressure will always be the same, so that when such minimum pressure period for the application of a predetermined pressure to a filter cake of a given material and of a given thickness to reduce the liquid content of the cake to a predetermined uniform moisture content has been once determined, then thereafter the desired result may be obtained by the application of such predetermined pressure for such predetermined period. The period for which pressure is maintained should desirably be slightly longer than the minimum required in order to provide against slight variations in the material, the thickness of the cake and the starting moisture content. Examples of the degree of pressure and pressure period required for securing a certain uniform moisture content in certain material have already been given.

The word "impervious" as used in the claims will be understood as meaning impervious to the filtrate or to the pressure fluid, as the case may be, unless given a more limited meaning, as in the expression "impervious to the solid matter".

What is claimed is:

1. The method of separating liquid and solid constituents of a mixture of liquid and suspended solid matter, which comprises filter-pressing the mixture to separate liquid from the solid matter and form a filter cake of the solid matter against a filtering surface, and separating a further amount of the liquid from the solid matter by pressing the filter cake between said filtering surface and a flexible impervious surface.

2. The combination with filtering means for separating the greater portion of the liquid from a mixture of liquid and suspended solid matter and forming a filter cake of the solid matter and the remaining portion of the liquid, of means for applying pressure to the filter cake by pressure fluid acting through an impervious sheet of flexible material in contact with the filter cake to press the filter cake against the filtering surface and thereby separate a further amount of the liquid from the solid matter.

3. The combination with a filter press, of means for pressing the filter cake against the filtering surface comprising a sheet of flexible material having a smooth impervious surface for contact with the filter cake and means for supplying pressure fluid to force said sheet against the filter cake.

4. In a filter press, the combination of a member having a central filtering surface and an impervious surface surrounding the filtering surface, and a spacing frame adapted to be assembled with said member in engagement with the impervious surface of said member and to be separated from said member, the impervious surface of said member extending inward a short distance from the inner edge of the spacing frame.

5. In a filter press, the combination of a pair of plates, a spacing frame, means for releasably holding the plates against opposite sides of the frame, the inwardly facing surface of each plate having a central filtering portion and an outer impervious portion which extends inward a short distance from the inner edge of the spacing frame, and an inflatable pressure member mounted within the frame having opposite impervious walls of flexible material, and means for supplying pressure fluid to said inflatable member.

6. In a filter press, the combination with a drainage plate and a spacing frame and means for releasably holding the plate and frame together, of a filter cloth on the face of the drainage plate having an impervious outer portion to prevent filter cake from being formed in contact with the spacing frame.

7. In a filter press, the combination with a drainage plate, of a filter cloth on the face of the drainage plate, and means for preventing the flow of filtrate through an outer zone of the filter cloth within the filter chamber, the width of which outer zone is greater than the thickness of the filter cake.

8. In a filter press, the combination of a drainage plate, a filter cloth on the drainage plate, means for preventing the flow of filtrate through an outer zone of the filter cloth within the filter chamber, the width of which outer zone is greater than the thickness of the filter cake, and means for pressing the filter cake against the filtering surface comprising an impervious sheet of flexible material and means for supplying pressure fluid to force said sheet against the filter cake.

9. In a filter press, the combination of a pair of plates having on their facing sides means providing filtering surfaces, a spacing frame between said plates, means for releasably holding the plates against opposite sides of the spacing frame, an inflatable pressure bag mounted in the spacing frame between the plates, and means providing a filling inlet for supplying a pressure fluid to the bag.

10. In a filter press, the combination of a pair of plates having on their facing sides means providing filtering surfaces, a spacing frame between said plates, means for releasably holding the plates against opposite sides of the spacing frame, an inflatable pressure bag of elastic flexible and expansible material mounted in the spacing frame between the plates, a collapsible holding ring within the bag for holding the bag in position in the frame, and means providing a filling inlet extending through the spacing frame for supplying a pressure fluid to the bag.

11. In a filter press, the combination of a plurality of drainage plates and a plurality of spacing frames set between successive plates, means for holding the plates and frames pressed together in assembled position and for permitting the plates and frames to be spaced apart, the surfaces of the plates within the frames being provided with filter cloths, means for supplying the mixture of liquid and solid matter to be filtered to the filter chambers within the frames between adjacent plates, inflatable pressure members within the filter chambers, and means for supplying pressure fluid to said inflatable pressure members.

12. In a filter press, the combination of a plurality of drainage plates and a plurality of interposed spacing frames between adjacent plates, releasable means for pressing the plates and frames together in assembled position, filter cloths on the faces of the drainage plates, means for preventing the passage of liquid through an outer zone of each filter cloth within the filter chamber, an inflatable pressure bag carried by each frame having walls of flexible elastic and expansible material formed to be flat when deflated and mounted with its edges held against the inner face of the frame, inlets extending through the frames for supplying pressure fluid to the pressure bags, and inlets extending through the frames for supplying the mixture of liquid and solid matter to be filtered to the filter chambers at each side of the bags.

13. In a filter press, the combination of a plate and a spacing frame and means for releasably holding the plate against the frame to form a side of a filter chamber, of a covering of wire gauze on the inner face of the plate, and a filter cloth extending over the gauze, the gauze and filter cloth covering the face of the plate within the frame and extending outward between the frame and the plate, and the filter cloth having an impervious outer portion to prevent filter cake from being formed in contact with the frame.

14. In a filter press, the combination of press ends, tension members extending between the press ends, a plurality of drainage plates slidably mounted on the tension members, a plurality of spacing frames slidably mounted on the tension members between adjacent drainage plates, means at one of the press ends for releasably holding the drainage plates and spacing frames pressed together in assembled position, mixture inlets extending through the spacing frames, a mixture supply manifold, flexible supply connections between the supply manifold and said inlets, inflatable pressure members having opposite walls of flexible material mounted in the spacing frames, inlets extending through the spacing frames to said inflatable pressure members, a pressure fluid manifold, and flexible supply connections between the pressure fluid manifold and said pressure fluid inlets.

In testimony whereof I have hereunto set my hand.

WILLIAM BARTON EDDISON.